United States Patent Office 3,464,706
Patented Sept. 2, 1969

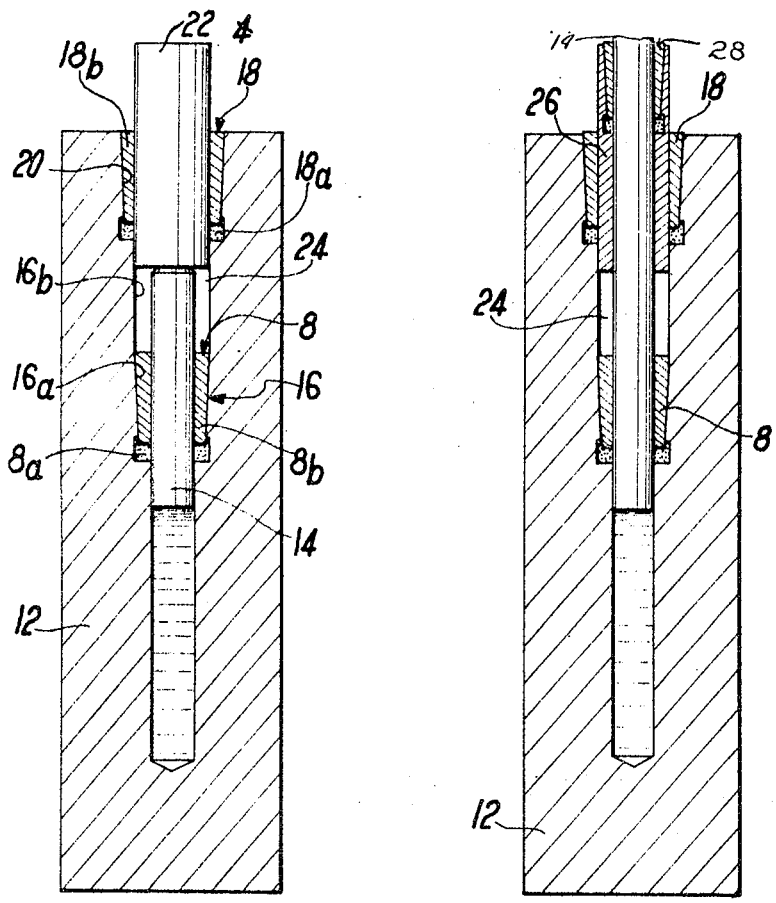
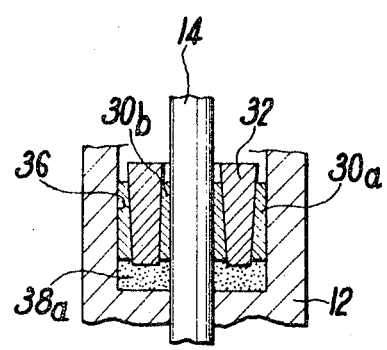

3,464,706
HIGH-PRESSURE SEALING SYSTEM
Paul Antoine Alexandre Cogez, Montrouge, Madeleine Marcelle Conte, Conde, and Jacques Georges Robert Sabatier, Paris, France, assignors to Commissariat a l'Energie Atomique, Paris, France
Filed Sept. 20, 1966, Ser. No. 580,706
Claims priority, application France, Oct. 15, 1965, 35,205
Int. Cl. F16j *15/40, 15/44;* B65d *53/00*
U.S. Cl. 277—59                    4 Claims

ABSTRACT OF THE DISCLOSURE

A seal between a component passing through a second component includes a recess in one of the components around the other component. A powder in the recess is compressed by a bushing. A second recess forms an extension of the first recess and contains a powder also compressed by a bushing. A compressible fluid fills the two recesses.

---

This invention relates to a sealing system which is primarily intended for vessels containing fluid at very high pressure.

The aim of this invention is to provide both a static seal for a stationary component which traverses the wall of a vessel and a dynamic seal for a moving component which traverses said wall and either slides or rotates with respect to this latter, leak-tightness being ensured even when the pressure of the internal fluid is extremely high.

The invention is accordingly directed to a system for providing a leak-tight passage between two components, characterized in that provision is made in said system for a powder contained in an internal recess of one of said components and compressed by a bushing which is force-fitted in said recess, a second powder contained in an enlarged extension of said recess and compressed by a second force-fitted bushing, and a reinforcement of the second component at the level of said enlarged portion but extending beyond said enlarged portion so as to delimit with the first bushing between the two components a chamber which is filled with compressible fluid.

The powder is thus pressed against the internal component and closely follows the shape of this latter. The grains may be deplaced as a result of the movement of said component but nevertheless remain in close contact therewith and completely seal off the passage, thereby preventing any leakage of fluid.

Any such leakage of fluid would in any case produce an increase in the pressure which prevails within the fluid-filled chamber and consequently increase the compressive force exerted by the bushing, thus restoring absolute leak-tightness.

Other properties and advantages of the invention will in any case become apparent from the following detailed description of a seal in accordance with the invention which is given by way of example and not in any sense by way of limitation, reference being had to the accompanying drawings, in which:

FIG. 1 is an axial sectional view of a sealing system according to the invention;

FIG. 2 is an axial sectional view of an alternative form of construction of the sealing system which is provided with multiple seals;

FIG. 3 is another axial sectional view of an alternative form of construction of the sealing system.

There is shown in these figures a sealing system which is mounted on a pressure chamber around a plunger but it is obvious that the invention can be employed for enclosures of any type such as vessels, pots, cylinders, molds or the like around either a stationary or moving component or even between two components which are placed within the same opening of the vessel or enclosure.

The pressure chamber 12 which is illustrated is filled with a pressure-transmitting fluid which is compressed by a plunger 14 operated from the exterior. The plunger 14 traverses the wall of the chamber 12 at the center of a recess 16 which serves as a housing for a seal 8. Said seal comprises a powder 8a of metal or metal oxide such as alumina, for example, which is compressed between the bottom of the recess and a bushing 8b, which is force-fitted in the wall of said recess. The bushing 8b is tapered while the recess 16 also has a tapered wall, at least in the external portion thereof which corresponds to the bushing.

The plunger 14 is in rubbing contact with the bushing 8b but is nevertheless capable of either sliding or rotational displacement with respect to said bushing. On the other hand, the bushing itself is immovably secured by virtue of its exact fit within the recess 16. Said bushing is formed of a material which has a high coefficient of friction such as, for example, a sintered compound of aluminum and aluminum oxide such as the product which is known commercially as "Frittoxal."

The grains of the powdered material 8a are sufficiently large to be stopped by the small clearance provided between the plunger 14 and the wall of the chamber 12 but are nevertheless sufficiently small to maintain a good contact with the plunger itself even when this latter carries out a movement of displacement. Moreover, the compressive stress exerted by the bushing 8b is such that the grains ensure satisfactory leak-tightness even in the event of rotation of the plunger 14.

The recess 16 has a tapered internal portion 16a for accommodating the seal 8, a cylindrical portion 16b, an enlarged portion 20 which forms an extension of said cylindrical portion and in which is fitted a second bushing 18b for the purpose of compacting a powder 18a. As in the case of the tapered internal portion 16a, the enlarged portion 20 is slightly tapered also. The bushing 18b presses the powder 18a against a plunger 22 which is rigidly coupled to the plunger 14 but the diameter of which corresponds to the external diameter of the cylindrical bore 16b.

Said plunger 22 delimits with the plunger 14, the seal 8 and the bore 16 an annular chamber 24 which is filled with a fluid of higher compressibility than the fluid contained in the pressure chamber 12, said annular chamber being maintained at a pressure which is lower than that which prevails within said chamber 12.

Any effort exerted on the plungers 22 and 14 which tends to compress the fluid of chamber 12 produces a back-pressure of the fluid of chamber 24 on the seal 8, thereby increasing the degree of leak-tightness.

Moreover, if a leak were to occur in the seal 8, the fluid admitted from the chamber 12 would exert a pressure on the fluid contained in the chamber 24. Inasmuch as the fluid contained in the chamber 24 has a higher degree of compressibility than that of the fluid contained in chamber 12 and cannot escape to the exterior by virtue of the seal 18, the fluid of chamber 24 would accordingly be compressed, thereby forming an obstruction and setting up a resistance to the leakage flow which would be correspondingly greater as the leakage rate is higher.

In order to prevent precompression of the fluid contained in chamber 24, it is possible as shown in FIG. 2 to make the two plungers independent of each other. The external plunger 26 is in that case constituted by a sleeve in which the plunger 14 is capable of sliding. Said sleeve 26 is provided with an internal bore for the purpose of accommodating a seal or packing gland 28 which ensures leak-tightness of the plunger 14 in sliding motion.

The position of said plunger and consequently the pressure of the chamber 12 can thus be regulated without influencing the pressure within the chamber 24, said pressure being controlled solely by means of the plunger 26. The back pressure which is exerted on the seal 8 can thus be modified at any moment without thereby producing any modification of pressure within the chamber 12. Leak-tightness of a very high order can therefore be obtained under well determined operating conditions and can be maintained without changing these conditions.

In an alternative form of embodiment which is illustrated in FIG. 3, the powder 38a is compressed by a bushing 30 which is constituted by two annular members 30a and 30b of "Frittoxal" or any like material, the opposite surfaces of which are tapered. A ring 32, which is preferably formed of steel, is forcibly inserted between said two annular members 30a and 30b and tends to separate these latter. Said ring has tapered internal and external surfaces, thus having a wedge-like action and having a tendency to clamp the annular members respectively against the wall of the recess 36 of the chamber 12 and against the plunger 14.

In this case, the recess 36 has preferably a cylindrical external shape and the annular member 30a also has a cylindrical external surface.

Rubbing or friction forces are then essentially exerted on the tapered surfaces, that is to say on the contact surfaces of the annular members 30a and 30b and of the ring 32 and not on the wall of the chamber 12. In addition, said seal is of generally cylindrical external configuration and can therefore be withdrawn with relative ease without resulting in deformation of the wall of chamber 12.

Leak-tightness which is obtained by means of said seal is of a very high order. In fact, it has proved possible in the course of tests to subject a pressure-transmitting fluid to a pressure of 45,000 kgs./cm.$^2$ without any resultant leakage.

It is readily apparent that a number of other modifications could be made in the sealing system which has just been described without thereby departing either from the scope or the spirit of this invention.

What we claim is:

1. A sealing system providing a leak-tight passage between two components which comprises a first internal recess in one of the components, the other of the components passing through said first recess, a powder in said recess, a force-fitted bushing in said recess compressing said powder between said bushing and the two components, a second internal recess forming an enlarged extension of said first recess, a reinforcement for the second component passing through said second recess, a second powder in said second recess compressed by a second force-fitted bushing between the first component and said reinforcement, a sealing chamber defined by said first bushing, the two components and said reinforcement and a compressible fluid filling said chamber.

2. A sealing system in accordance with claim 1, the bushing comprising two coaxial annular members which have respectively an internal taper and an external taper, said members being separated by a ring which has both an internal taper and an external taper.

3. A sealing system in accordance with claim 1 including a strengthening sleeve slidably fitted on the second component, an internal recess in said sleeve a seal in said recess including a powder in said recess and a force-fitted bushing compressing said powder.

4. A sealing system for providing leaktightness through the wall of a vessel which contains fluid at high pressure in accordance with claim 1 the fluid contained in said chamber being more highly compressible than the fluid which is contained in the pressure vessel.

References Cited

UNITED STATES PATENTS

| 1,594,935 | 8/1926 | Force | 277—64 X |
| 2,126,366 | 8/1938 | Boyer | 277—115 X |
| 2,299,813 | 10/1942 | Franks | 277—236 X |
| 2,796,229 | 6/1957 | Newhall | 277—59 X |
| 2,986,244 | 5/1961 | Hutchison | 277—115 X |

FOREIGN PATENTS 958,793  2/1957  Germany.

LAVERNE D. GEIGER, Primary Examiner

JEFFREY S. MEDNICK, Assistant Examiner

U.S. Cl. X.R.

277—115